United States Patent [19]

Maeda

[11] Patent Number: 4,841,397
[45] Date of Patent: Jun. 20, 1989

[54] HEAD SHIFTING DEVICE

[75] Inventor: Masaya Maeda, Yokohama, Japan

[73] Assignee: Canon Kabushiki Kaisha, Tokyo, Japan

[21] Appl. No.: 148,131

[22] Filed: Jan. 26, 1988

Related U.S. Application Data

[63] Continuation of Ser. No. 847,202, Apr. 2, 1986, abandoned.

[30] Foreign Application Priority Data

Apr. 4, 1985 [JP] Japan ............................ 60-71732

[51] Int. Cl.$^4$ .............................................. G11B 5/54
[52] U.S. Cl. ................................................... 360/105
[58] Field of Search ...................... 360/109, 105, 106

[56] References Cited

U.S. PATENT DOCUMENTS 4,092,681 5/1978 Dix et al.
4,241,366 12/1980 Nishida ............................ 360/105
4,302,789 11/1981 Vos .................................. 360/105
4,423,499 12/1983 Peschel ............................. 369/55
4,603,364 7/1986 Tronzano .......................... 360/105

Primary Examiner—A. J. Heinz
Attorney, Agent, or Firm—Toren, McGeady & Associates

[57] ABSTRACT

In a recording or reproducing apparatus which changes the recording or reproducing position thereof from one position to another by shifting a recording or reproducing head in the radial direction of a disc-shaped flexible recording medium, a head shifting device is arranged to bring the head into contact with the recording medium only when the head is in the recording or reproducing position in relation to the shift of the head; and to have the head retracted from the recording medium when the head is in other positions. This device effectively prevents the recording medium from being deformed or damaged on its recording surface, for example, when the head is left in contact with the medium over a long period of time while the medium is in repose.

29 Claims, 6 Drawing Sheets

HEAD SHIFTING DEVICE

This is a continuation of application Ser. No. 847,202, filed Apr. 2, 1986 abandoned.

BACKGROUND OF THE INVENTION

1. Field of the Invention

This invention relates to a head shifting device employed in a recording or reproducing apparatus which changes the recording or reproducing position thereof from one position to another by shifting a recording or reproducing head in the radial direction of a disc-shaped flexible recording medium.

2. Description of the Prior Art

Various magnetic recording or reproducing apparatuses have been known which record or reproduce a video signal of a still or slow motion picture, an audio signal, a data signal, or other information by bringing a magnetic head into contact with a flexible magnetic disc contained in a cassette. In the magnetic recording or reproducing apparatus of this kind, if the magnetic recording or reproducing apparatus is unused over a long period of time with the cassette left loaded on the apparatus, a portion of the magnetic disc in contact with the head tends to be permanently deformed by the protrudent state of the magnetic head or, in some cases, the head comes to stick to the disc because the magnetic head under that condition remain in contact with the flexible magnetic disc contained in the cassette. Then, if the magnetic disc is rotated in that state, the magnetic material on the recording surface of the magnetic disc would be peeled off. In recording, the peeled part becomes unrecordable. In reproduction, it becomes a video signal undetectable region and thus results in a signal drop-out.

To avoid this inconvenience, an arrangement has been proposed to have the head set in a specific position remote from the recording area on the magnetic disc when no recording or reproduction is to be performed over a long period of time.

However, the recordable density of signals on a magnetic disc has increased during recent years. As a result, the size of the magnetic disc is tending to become smaller. Therefore, even if the magnetic head is positioned outside of the recording area of the magnetic disc as mentioned above, a swelled portion of the disc which is formed with the head at the apex of the swell would spread to the recording area to cause a permanent deformation of the recording area.

In view of this, a method has been proposed to have the head set away from the magnetic disc in the specific position remote from the recording area on the magnetic disc when no recording or reproduction is to be performed over a long period. As an alternative, another method is also proposed to arrange the head to be movable back and forth relative to the disc in response to locking and unlocking operations of a recording operation member provided on the recording apparatus.

However, the former method requires shifting the head to a given position outside the recording area of the recording medium and then moving the head away from the medium or disc. This tends to result in a complex structural arrangement of a head shifting device or a complex control system for the device. Further, in recording or reproduction, the head must be shifted over a given distance to a required position. This impairs the promptness of the recording or reproducing operation. In the case of the latter method, the head shifting device must be provided with some arrangement to interlock the device with a lock device for the recording operation member. This requirement not only tends to result in a complex structural arrangement, but also presents another problem that the head would be left in contact with the recording medium if a locking operation is not performed as an oversight. Therefore, that method does not give a sufficient assurance for elimination of the inconvenience mentioned in the foregoing.

SUMMARY OF THE INVENTION

It is an object of this invention to provide a head shifting device which is capable of preventing, with simple structural arrangement, a magnetic recording disc from being damaged. To attain this object, in a recording or reproducing apparatus of the kind which changes the recording or reproducing position thereof by shifting a recording or reproducing head in the radial direction of a disc-shaped flexible recording medium, a head shifting device, arranged according to this invention as an embodiment example thereof, comprises: First means for shifting the head in the radial direction of the recording medium; and second means for moving the head toward and away from the recording medium in association with the radial movement of the head. To attain this object, another embodiment of this invention is arranged to have the head automatically moved back and forth relative to the recording medium in a repeating manner, accordingly, as the head is shifted in the radial direction of the medium, so that the head can be readily set in its retracted position in cases where no recording nor reproduction is performed. This eliminates the danger of having the recording medium deformed or damaged by the head.

It is a further object of this invention to provide a recording or reproducing apparatus which is capable of always stably controlling the relation between a recording medium and the head thereof.

It is a still further object of this invention to provide a head shifting device which changes a distance between the surface of a recording medium and the head of a recording or reproducing apparatus according to the shift of a positional relation which takes place between them along the surface of the recording medium. To attain this object, a head shifting device, arranged according to this invention as a further embodiment thereof, comprises: First means for moving the head along the surface of the recording medium; and second means for changing a distance between the head and the recording medium relative to each other, accordingly, as the positional relation between the head and the medium is changed by the first means. Therefore, the arrangement of the embodiment ensures that the head has access to and comes into contact with the recording medium only for recording or reproduction and that the medium is never deformed by the head while the head does not have access to the recording medium for recording or reproduction.

Further, a recording or reproducing apparatus arranged as a further embodiment of this invention comprises: A recording or reproducing head; a motor arranged to continuously change the positions of a recording medium and the head relative to each other in a first direction along the surface of the medium; first means for changing the positions of the recording medium and the head relative to each other in a second direction along the surface of the medium, the second direction being different from the first direction; and second means for changing a relative distance between the head and the medium, accordingly, as the positional change in the second direction is brought about by the first means. Therefore, this embodiment ensures that the head can be brought into contact with the medium according to the positional change between the medium and the head brought about by the first means for having access in the second direction, and that the medium is never damaged by any accidental contact with the head while no recording nor reproduction is performed.

These and further objects and features of this invention will become apparent from the following description thereof taken in conjunction with the accompanying drawings.

DETAILED DESCRIPTION OF THE PREFERRED EMBODIMENTS

Figure 1A:
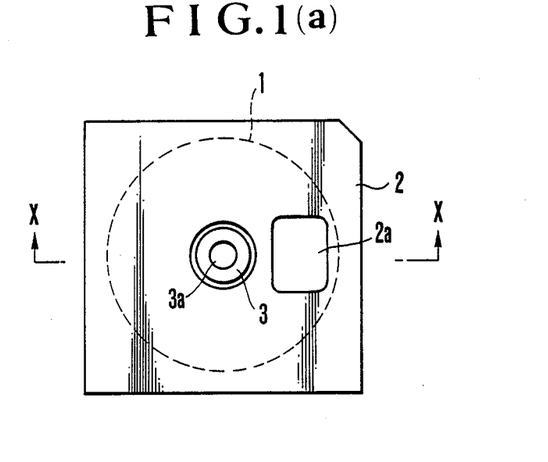
FIG. 1(a) is a plan view showing a magnetic disc cassette to be used by a recording or reproducing apparatus to which this invention is applicable.
Figure 1B:
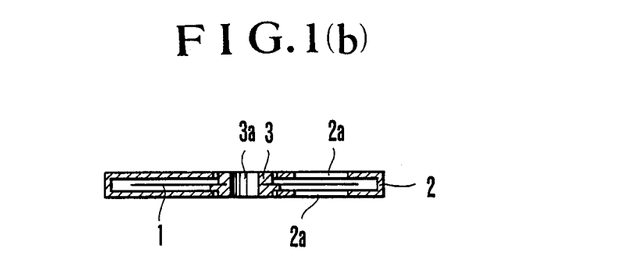
FIG. 1(b) is a sectional view taken along line X—X of FIG. 1(a).
Figure 2A:
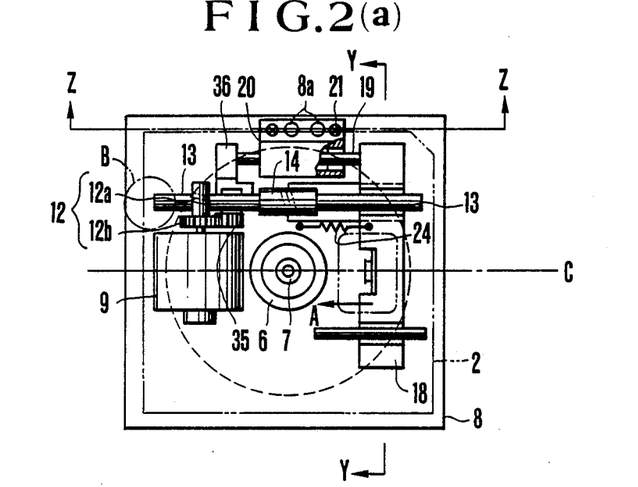
FIG. 2(a) is a plan view of the same embodiment.

The following describes some preferred embodiments of this invention with reference to the accompanying drawings:

A magnetic disc cassette to be used by a recording or reproducing apparatus embodying this invention is arranged as shown in FIGS. 1(a) and 1(b). FIG. 1(a) shows it in a plan view and FIG. 1(b) in a sectional view taken along line X—X of FIG. 1(a). A flexible magnetic disc 1 serves as a recording medium. A cassette 2, which is formed with a resin material into a flat box-like shape, contains the magnetic disc 1 therein. A hub 3 is secured to the middle part of the magnetic disc 1. A center hole 3a is formed in the hub 3. The hole 3a of the hub 3 is arranged to be fit on a spindle 7 which is coaxially mounted on the shaft of a disc rotating motor 6 as shown in FIG. 2(a). The magnetic disc 1 is thus arranged to be rotated by the motor 6 together with the spindle 7. As shown in FIG. 1(b), a pair of apertures 2a are formed in upper and lower sides of the cassette 2 in mutually corresponding positions. The lower aperture 2a permits a recording or reproducing magnetic head 5 to be inserted into the cassette 2 and to come into contact with the recording surface of the disc 1.

Figure 1C:
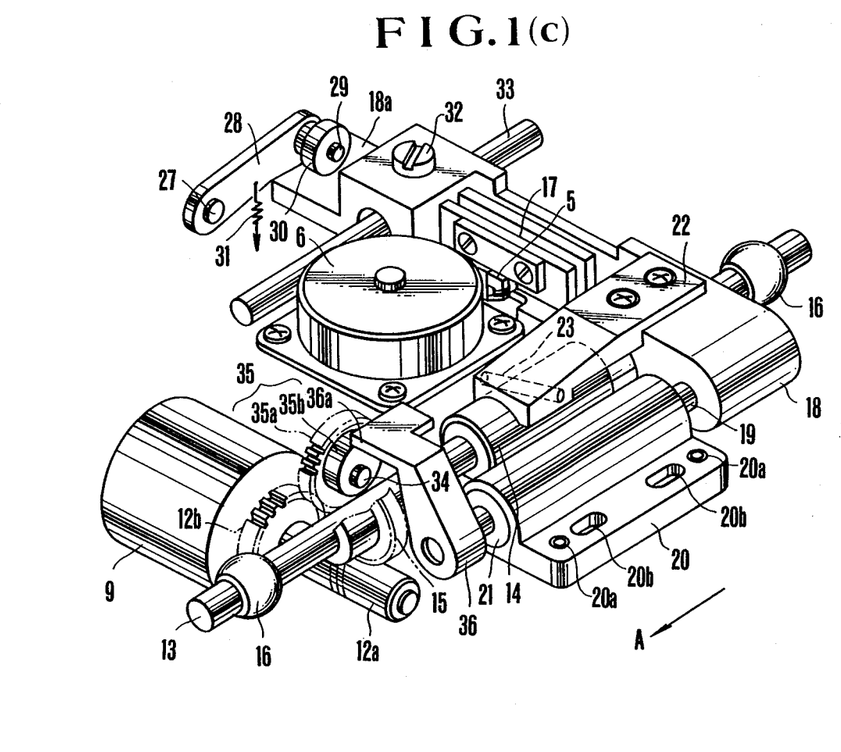
FIG. 1(c) is an oblique view showing an embodiment of this invention as viewed from a reverse side thereof.
Figure 2B:
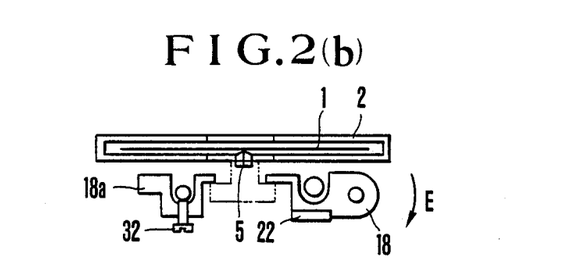
FIG. 2(b) is a sectional view taken along line Y—Y of FIG. 2(a).

An embodiment of this invention is arranged as follows: FIG. 1(c) shows this embodiment as viewed from the reverse side thereof. In other words, FIG. 1(e) is an oblique view showing it in the direction reverse to the direction in which the embodiment is to be loaded with the magnetic disc cassette 2. FIG. 2(a) shows the same embodiment in a plan view as viewed from the cassette mounting side thereof. FIG. 2(b) is a sectional view taken on line Y—Y of FIG. 2(a).

The disc rotating motor 6 is secured to the chassis 8 of the apparatus body and is arranged to rotate, via the spindle 7 (FIG. 2(a)), the magnetic disc 1 contained in the cassette 2 at a given rotational frequency. A stepping motor 9 serves as a drive source for shifting, thrusting and retracting operations on the magnetic head. The motor 9 is likewise secured to the body chassis 8 and is provided with an output shaft. The output shaft of the stepping motor 9 is secured to a gear 12 which is formed in one unified body with a worm gear 12a and a spur gear 12b. The worm gear 12a engages a worm wheel 15 which is coaxially mounted on a screw shaft 13 in one body therewith. The screw shaft 13 is provided with a head driving lead screw 14 (hereinafter referred to simply as the screw) which is a central element of head shifting means and is arranged coaxially and in one unified body with the screw shaft 13. The shaft 13 is rotatably carried at its two ends by bearings 16 which are secured to the body chassis 8.

The magnetic head 5 is fixedly carried, via an adjusting device 17, by a head carrier 18. A guide shaft 19 is secured by press fitting to one end of the carrier 18.

A bearing housing 20 is formed in an approximately cylindrical shape. Bearings 21 are coaxially inserted into the opposite ends of the cylindrical hole of the housing 20 in a press fit manner. The housing 20 is secured to the body chassis 8 at two screw holes provided in its screw clamping part. The guide shaft 19, which is secured by press fit to the head carrier 18, is pivotally carried by the bearings 21 in such a way as to be linearly and rotatively movable. Meanwhile, the head carrier 18 is urged by the force of a spring 24 to move in the direction of arrow A as shown in FIGS. 1(c) and 2(a).

Figure 2C:
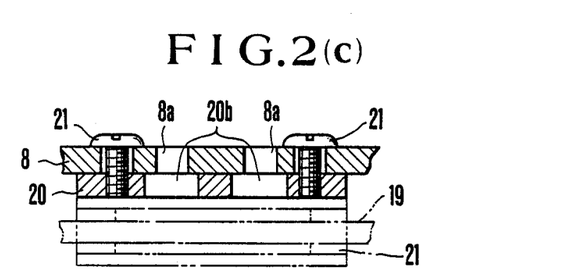
FIG. 2(c) is a sectional view taken along line Z—Z of FIG. 2(a).
Figure 3:
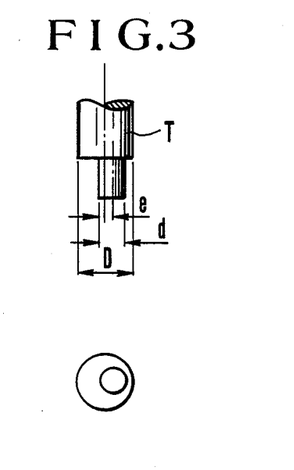
FIG. 3 shows a tool driver for adjusting a bearing housing mounting position.

FIG. 2(c) shows, in an enlarged sectional view taken on line Z—Z of FIG. 2(a), the details of the screw clamping part provided for screwing the bearing housing 20 to the body chassis 8. While the housing 20 is thus secured by screws 21 to the body chassis 8, the chassis 8 is provided with two adjustment holes 8a. The screw clamping part of the bearing housing 20 is provided with slots 20b which are formed in positions corresponding to the adjustment holes 8a. The diameter and slot width of these holes 8a and slots 20b respectively correspond to the distances D and d of the fore end part of a tool driver T which is as shown in FIG. 3. The tool driver T is arranged to be an eccentric driver.

The position of the bearing housing 20 can be finely adjusted after completion of adjustment of the position of the head 5 in contact with the magnetic disc 1, by fitting the fore end diameter parts D and d of the tool driver T, respectively, into the adjustment holes 8a and the slots 20b and by turning the driver T with the mounting screws left in a state of being lightly tightened. Under this condition, the center of the head 5 can be precisely adjusted to a center line C intersecting the center of rotation of the disc rotating motor 6 while optically measuring the position of the head 5 by means of a microscope or the like.

A needle holder 22 is secured to the head carrier 18. A needle 23 is secured to the needle holder 22 in a press fit manner. The needle 23 is in an engaging relation to the screw 14 and is caused to abut on the screw part of the screw 14 by the above-stated spring 24. The spring force of the spring 24 also exerts a thrust force on the screw 14 in the direction of arrow A of FIG. 2(a).

Figure 4:
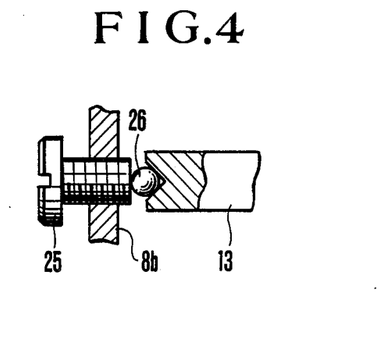
FIG. 4 is an enlarged view showing the details of a thrust pad arranged for a screw shaft.

FIG. 4 shows, in an enlarged view, the details of the thrust receiving part B of the screw shaft 13 shown in FIG. 2(a). A steel ball 26 is placed in a recess formed in the end face of the screw shaft 13. A head position adjustment screw 25, which engages a screw hole formed in a wall part 8b of the body chassis 8, is arranged to receive the thrusting force coming via the steel ball 26. The position of the head corresponding to the stopping position of the stepping motor 9 thus can be adjusted by turning this position adjustment screw 25. Further, the needle holder 22 is made of such a material that the length of which varies to the same degree as the change taking place in the radius of the magnetic disc 1 due to thermal expansion. Therefore, the degree of deviation in the positional relation between the head and recording tracks due to changes in temperature can be minimized by virtue of this arrangement.

An arm 28 is pivotally carried at one end thereof by a shaft 27 which is secured to the body chassis 8. A spring 31 urges the arm 28 to turn clockwise on the shaft 27 as shown in FIG. 1(c). A roller shaft 29 is attached to the other end of the arm 28. A roller 30 is rotatably carried by the roller shaft 29. Under the urging force of the above-stated spring 31, the roller 30 is pushing a protrusion 18a of the head carrier 18. In other words, under the condition of FIG. 1(c), the head carrier 18 is urged to turn counterclockwise on the guide shaft 19, i.e. in the direction of thrusting the head 5. In FIG. 2(b), the above-stated turning force is shown as exerted in the direction of arrow E. This turning force causes the fore end of a head height adjustment screw 32, which engages a screw hole provided in the head carrier 18, to abut with given pressure on a head height datum shaft 33 which is secured to the body chassis 8. As apparent from FIG. 2(b), the head carrier 18 turns counterclockwise, according, as the head height adjustment screw 32 is screwed inwardly. By this, the protruding extent of the head 5 can be shortened. Conversely, the protruding extent of the head 5 can be increased by screwing the adjustment screw 32 outwardly. More specifically, the head carrier 18 is linearly guided by the bearing 21 in the head feeding direction while it is restricted from turning around the guide shaft 19 by the head height datum shaft 33. The head 5 is thus carried to be shiftable only in the radial direction of the magnetic disc 1 while its height is under the above-stated restriction.

The driving gear 12 is secured to the output shaft of the stepping motor 9 as mentioned in the foregoing. The worm part 12a of the gear 12 is engaging the worm wheel 15 which is arranged in one body with the screw shaft 13. Therefore, the head carrier 18 moves in the radial directions of the magnetic disc 1 toward the periphery or toward the center of the disc 1 according to the forward or reverse rotation of the stepping motor 9. Further, in this instance, the gear ratio between the worm wheel 15 and the worm part 12a is so arranged that the head 5 is shifted to an extent corresponding to 12 track pitches when the stepping motor 9 rotates 2N steps.

Figure 5A:
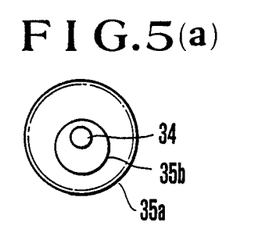
FIG. 5(a) is a plan view showing a cam gear.

The spur gear 12b of the driving gear 12 engages the gear part 35a of the cam gear 35 which is rotatably carried by the shaft 34 secured to the body chassis 8. The cam gear 35 consists of the gear part 35a and a cam part 35b which is formed in one body with the gear part 35a and is arranged to serve as a central element for the head thrusting-and-retracting means. The gear ratio between the gear part 35a and the gear 12b is arranged such that the cam gear 35 makes one turn while the head is shifted to the extent of one track pitch by the 2N step rotation of the stepping motor 9. The cam part 35b is arranged to complete a lift curve of one cycle when it makes one turn as shown in FIG. 5(a). The lift curve of the cam is preferably formed in a constant acceleration curve such as a sine curve or the like. A head shifter 36 is secured to the free end of the guide shaft 19 opposite to the end which is press fit inserted into the head carrier 18. The head shifter 36 is provided with a cam follower part 36a which is arranged to abut on the periphery of the cam part 35b. Therefore, the cam follower part 36a sways according to the cam lift of the cam part. This causes the guide shaft 19, which is in one unified body with the head carrier 18 to make a reciprocal motion within a predetermined angle range. As a result, the magnetic head 5 is thrusted toward and retracted from the magnetic disc 1, accordingly.

Figure 5B:
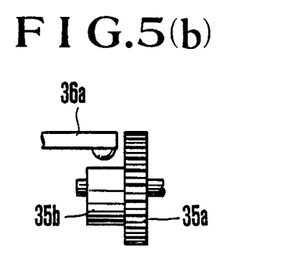
FIGS. 5(b) and 5(c) are side views showing the operation of the cam gear according to a thrusting/retracting changeover operation on a head respectively.
Figure 5C:
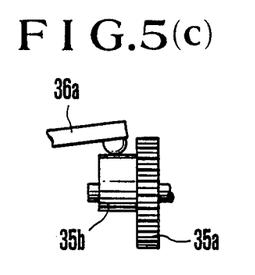

The apparatus which is arranged in the manner as described above operates as follows: When the stepping motor 9 rotates 2N number of steps, the cam gear 18 makes one turn while the head carrier 18 moves to the extent of one track pitch. The phasic position of the cam part 35b in this instance is such that the degree of a lift given to the cam follower 36a by the cam part 35b becomes the smallest when the head 5 is in the predetermined recording or reproducing position (absolute track position). In other words, the cam lift is then at a lower dead point. The periphery of the cam part 35b moves away from the cam follower 36a when the fore end of the head height adjustment screw 32 is brought into contact with the head height datum shaft 33 by the urging force of the spring 31 as shown in FIG. 5(b). In other words, the height of the magnetic head 5 is restricted by the head height datum shaft 33 only when the cam comes close to the lower dead point and is determined by the lift of the cam part 35b at every point of the cam other than the lower dead point (see FIG. 5(c)).

Figure 6:
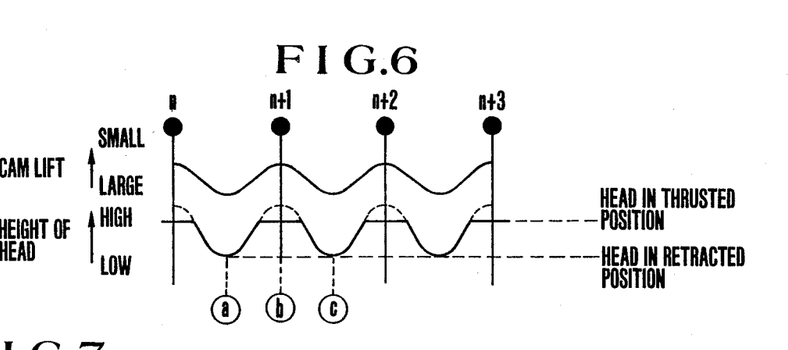
FIG. 6 is an illustration of the relation of a cam lift to the shifting and thrust/retraction movement of the head.

Referring to FIG. 6, the head 5 is in a protrudent recordable or reproducible state only when it is in the neighborhood of the absolute track position. With the exception of this, the magnetic head 5 always remains away from the magnetic sheet 1.

Figure 7:
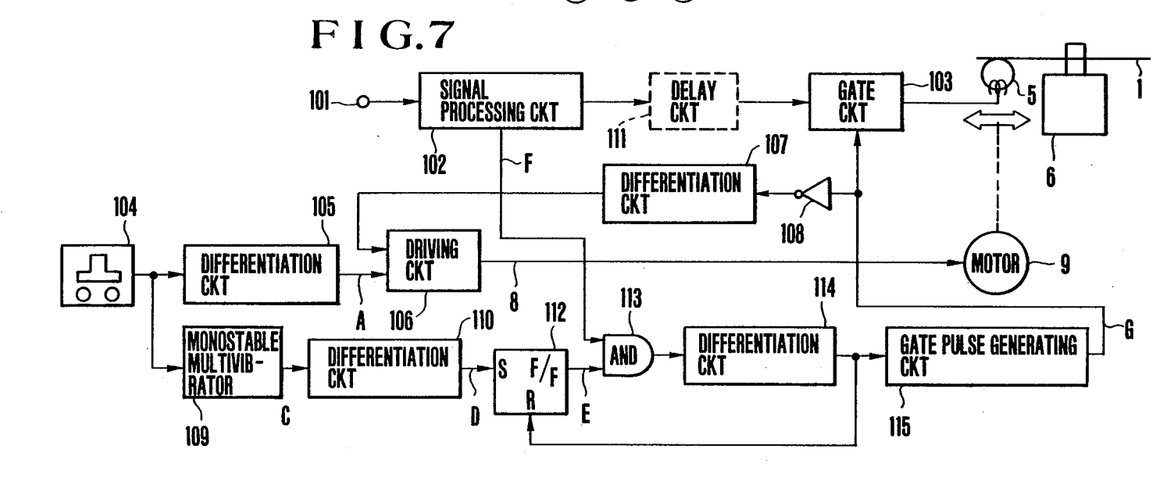
FIG. 7 is a circuit block diagram showing a control system for a stepping motor along with a recording system.
Figure 8:
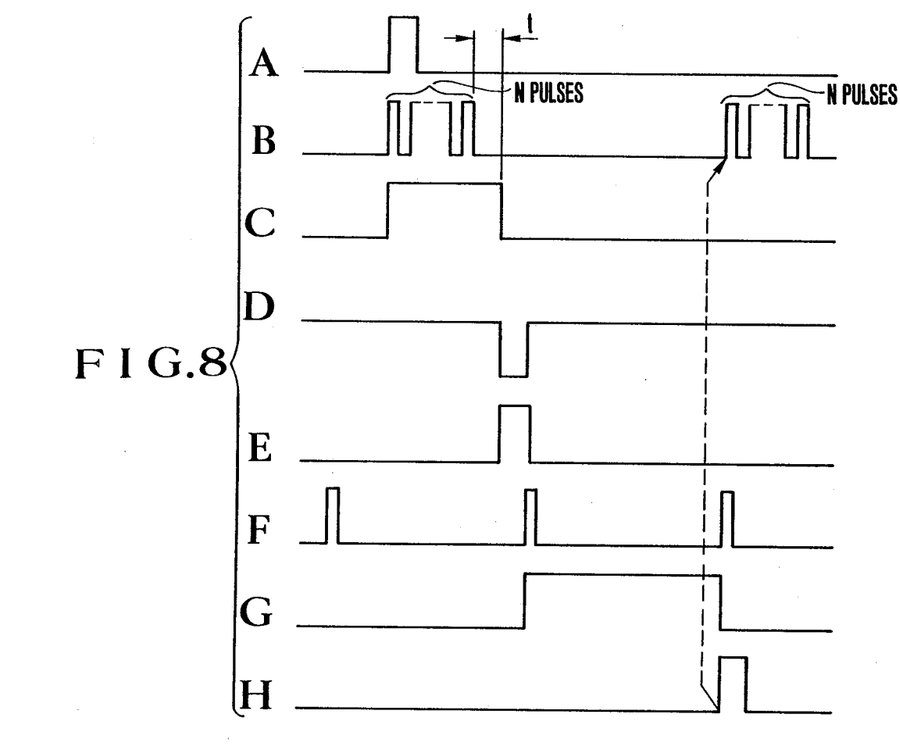
FIG. 8 is a timing chart showing the inputs and outputs of essential circuits blocks shown in FIG. 7

A control system for the stepping motor 9 is arranged as described below:

FIG. 7 shows the control system in a circuit block diagram and FIG. 8 the operation of it in a timing chart. Referring to FIG. 7, a signal produced with a recording button 104 operated is supplied to a differentiation circuit 105 and a monostable multivibrator 109. A positive pulse which is produced from the differentiation circuit 105 as shown in a part A of FIG. 8 causes a stepping motor driving circuit 106 to produce an N number of driving pulses as shown in a part B of FIG. 8.

Under a normal condition, the magnetic head 5 is in an intermediate position ⓐ between one track and another as shown in FIG. 6, that is, the head 5 is in a retracted position. However, with the N number of pulses produced, the stepping motor 9 rotates the N number of steps to bring the magnetic head 5 to the recording or reproducing position, i.e. a thrusted position ⓑ as shown in FIG. 6.

Meanwhile, in response to the operation of the recording button 104, the monostable multivibrator 109 produces a single pulse which is longer than the total length of the N number of pulses by a length of time t as shown in a part C of FIG. 8. This single pulse signal is applied to a differentiation circuit 110. The circuit 110 then produces a negative pulse signal as shown in a part D of FIG. 8. The negative pulse signal is supplied to the set terminal of a fall synchronizing type RS flip-flop 112. At that point of time, a signal processing circuit 102 separates a vertical synchronizing signal, which is as shown in a part F of FIG. 8, from a video signal coming from a terminal 101. The vertical synchronizing signal thus separated is supplied to one of the input terminals of an AND circuit 113.

Therefore, with the magnetic head 5 brought into the recording or reproducing position by the N number of driving pulses, a first vertical synchronizing signal passes through the AND circuit 113 after the lapse of the length of time t. The output of the AND circuit 113 is applied to a differentiation circuit 114. The circuit 114 then produces a positive pulse signal, which is supplied to a gate pulse generating circuit 115 and the reset terminal of the flip-flop 112. The flip-flop 112 then produces an output as shown in a part E of FIG. 8. Meanwhile, in response to this input, the gate pulse generating circuit 115 produces a gate pulse which is of a width corresponding to one vertical period as shown in a part G of FIG. 8. Then, in response to this, a gate circuit 103 supplies the magnetic head 5 with a recording signal produced from the signal processing circuit 102 just for the above-stated period. In this case, a delay circuit 111 is arranged in between the circuits 102 and 103 to make timing adjustment as necessary and to ensure that one field portion of the recording signal is appropriately gated.

The above-stated gate pulse which is as shown in the part G of FIG. 8 is supplied to a differentiation circuit 107 via an inverter 108. The differentiation circuit 107 produces a positive pulse at the fall of the gate pulse. This pulse output is applied to a stepping motor driving circuit 106. Then, the circuit 106 produces the N number of driving pulses. This causes the stepping motor 9 again to rotate to shift the magnetic head 5 to a stand-by state by bringing it into the position ⓒ as shown in FIG. 6.

After completion of the positioning process of the head 5, the time for triggering the recording process is arranged to be delayed at least for the period of time t as shown in the parts B and C. The reason for this delay arrangement is as follows: The magnetic head 5 might vibrate and the rotation of the magnetic disc 1 might fluctuate immediately after the head 5 comes into contact with the disc 1. Then, such vibration or fluctuation requires some period of time before they come to settle.

In accordance with the arrangement of this embodiment as described above, the magnetic head always remains away from the magnetic disc except when the head is in the recording or reproducing position. Therefore, the magnetic head and the magnetic disc can be effectively prevented from being abraded in a stand-by state while the disc is rotating. The magnetic disc can be effectively prevented from being permanently deformed when the apparatus is left unoperated in a state of being loaded with the cassette over a long period of time. It is another advantage that the arrangement of the embodiment does not impair the promptness of the recording or reproducing operation. Besides, the danger of omission to operate by an oversight also can be eliminated.

In accordance with this invention, a recording or reproducing apparatus of the kind using a disc-shaped flexible recording medium can be simply arranged to be capable of reliably eliminating the inconveniences of the prior art such as the possibility of deforming or damaging the recording medium.

What is claimed is:

1. A head shifting device in a recording or reproducing apparatus which changes a recording or reproducing position thereof from one position to another by shifting a recording or reproducing head in a radial direction of a disc-shaped flexible recording medium, said device comprising:

first means for shifting said head in the radial direction of said medium;

second means for repetitively moving said head toward and away from said recording medium as said head is shifted in said radial direction, said second means being arranged to shift said head to a position separated away from said recording medium when said head is shifted to change the recording or reproducing position from said one position to said another position; and control means for controlling said first means so that said head is stopped at a position location between the adjacent recording or reproducing positions.

2. A device according to claim 1, wherein said first and second means are arranged to be driven by a common drive source.

3. A device according to claim 1 or 2, wherein said head is arranged to be retracted away from said recording medium between one recording or reproducing position and another and to be brought into contact with said medium in each recording or reproducing position.

4. A device according to claim 1, wherein said second means is arranged to move said head forward or backward relative to said medium between a first position of said head in which recording or reproduction can be performed and a second position in which no recording nor reproduction can be performed.

5. A device according to claim 1, wherein said second means is provided with a cam which displaces said head accordingly as the head is radially shifted by said first means.

6. A device according to claim 5, wherein said cam is used for retracting said head.

7. A device according to claim 6, further comprising means for defining a distance between said head and said medium when said head is brought by said cam into a state of being movable toward said medium, said means being arranged separately from said cam.

8. A head shifting device comprising:

first means for moving a head a predetermined distance in a predetermined direction along a surface of a recording medium;

second means for repetitively changing a distance between said head and the surface of said recording medium every predetermined distance said head is moved in the predetermined direction by said first means, said second means being arranged to separate said head away from the surface of said recording medium on the way of movement of said head when said head is moved by said first means in said predetermined direction by said predetermined distance; and control means for controlling said first means so that the movement of said head in said predetermined direction stops at a position separated away from said recording medium when said second means moves said head to said position.

9. A device according to claim 8, wherein said first means is arranged to intermittently shift said head relative to said medium in said predetermined direction.

10. A device according to claim 8, wherein said second means is shiftable between a first state in which said head is brought into contact with said medium, and a second state in which said head is moved away from said medium.

11. A device according to claim 10, wherein said second means includes a control member for repetitively controlling said distance between said head and said recording medium to be changed by said second means in accordance with a head shifting extent of said first means.

12. A device according to claim 11, wherein said control member includes a cam.

13. A device according to claim 10, wherein said second means repetitively assumes said first and second states, accordingly as said head is displaced in said predetermined direction by said first means.

14. A device according to claim 10, further comprising signal supply means for enabling the supply of a signal to said head while said second means is in said first state.

15. A device according to claim 8, wherein said medium is a magnetic disc.

16. A device according to claim 8, further comprising driving means for displacing said head and said medium relative to each other along the surface of said medium in a direction different from said predetermined direction.

17. A recording or reproducing apparatus comprising:
(a) a recording or reproducing head;
(b) a motor arranged to continuously displace a recording medium and said head relative to each other along said medium in a first direction;
(c) first means for displacing said recording medium and said head along said medium in a second direction which differs from said first direction;
(d) second means for changing a relative distance between said head and said medium according to the place in said second direction by said first means said second means being arranged to separate said head away from said recording medium during movement of said head when said head is moved by said first means in said second direction by a predetermined displacement to change the recording or reproducing position; and
control means for controlling said first means so that the displacement of said head in said first direction effected by said first means is stopped in the state where said head is shifted by said second means to a position separated from said recording medium.

18. An apparatus according to claim 17, wherein said first means is arranged to intermittently shift said head relative to said medium in a predetermined direction.

19. An apparatus according to claim 17, wherein said second means is shiftable between a first state in which said head is brought into contact with said medium and a second state in which said head is moved away from said medium.

20. An apparatus according to claim 19, wherein said second means includes a control member for repetitively controlling said distance between said head and said recording medium to be changed by said second means in accordance with a head shifting extent of said first means.

21. An apparatus according to claim 20, wherein said control member includes a cam.

22. An apparatus according to claim 19, further comprising signal supply means for enabling the supply of a signal to said head while said second means is in said first state.

23. An apparatus according to claim 17, wherein said medium is a magnetic disc.

24. An apparatus according to claim 19, wherein said second means is arranged to repetitively assume said first and second states according to the displacement of said head and said medium caused to take place in said second direction by said first means.

25. A head shifting device for use in a recording or reproducing device arranged such that a recording or reproducing position of a recording or reproducing head is changeable by shifting said recording or reproducing head in a radial direction of a disc-shaped recording medium relative to said disc-shaped recording medium, on which a plural number of recording or reproducing permitting areas and a plural number of recording or reproducing prohibiting areas are coaxially and alternately arrange, comprising:
(A) first means for shifting said head in the radial direction of said medium;
(B) second means for moving said head, in accordance with the shifting operation of said first means, in such a manner that said head abuts on said medium in said plural number of recording or reproducing permitting areas on said medium, and is retracting away from said medium in said plural number of recording or reproducing prohibiting areas; and
(C) control means for controlling said first means so that said head is stopped at a position opposite to either one of said recording or reproducing prohibiting areas.

26. A device according to claim 25, wherein said first and second means are arranged to be driven by a common drive source.

27. A device according to claim 25, wherein said second means is provided with a cam which displaces said head accordingly, as the head is radially shifted by said first means.

28. A device according to claim 27, further comprising means for defining a distance between said head and said medium when said head is brought by said cam into a state of being movable toward said medium, said defining means being arranged separately from said cam.

29. A device according to claim 25, further comprising signal supplying means for enabling supply of a signal to said head while said head is maintained in contact with said medium in said plural number of recording or reproducing permitting ranges.

* * * * *